Aug. 18, 1959     E. W. COLEMAN, JR., ET AL     2,900,292

BONDING RUBBER TO METAL

Filed April 29, 1955

INVENTOR:
ELMER W. COLEMAN JR.
DONALD M. ALSTADT
BY Howson & Howson
ATTYS.

United States Patent Office 2,900,292
Patented Aug. 18, 1959

2,900,292
BONDING RUBBER TO METAL

Elmer W. Coleman, Jr., and Donald M. Alstadt, Erie, Pa., assignors to Lord Manufacturing Company, Erie, Pa., a corporation of Pennsylvania Application April 29, 1955, Serial No. 505,021

29 Claims. (Cl. 154—130)

The present invention relates to a method of bonding rubber to metal and to the resulting composite rubber-metal product. The present invention also relates to a novel adhesive position especially suitable for bonding rubber to metal.

The use of polymerized 2,3-dichlorobutadiene-1,3 to bond rubber to metal has been suggested. This material is primarily an adhesive for rubber so that when used to bond rubber to metal another material which adheres well to metal must be included in the adhesive. While poly 2,3-dichlorobutadiene-1,3 exhibits some adhesive properties toward rubber, the bond strength is not very great so that with most rubber stocks failure at the bond line will result. Moreover, the resistance of the bond to heat, solvents and moisture is not as great as is normally desired in commercial application. Another limitation with the use of 2,3-dichlorobutadiene-1,3 in a rubber-to-metal adhesive is that the vulcanizing conditions under which bonding is effected must be very carefully controlled.

It is the principal object of the present invention to provide a method of bonding rubber to metal which results in a vastly improved bond between the rubber and metal.

Another object of the invention is to provide a method of bonding rubber to metal whereby bonding may be effected under a wide variety of vulcanizing conditions.

Still another object of the invention is to provide rubber-metal bonded structures of improved quality.

Other objects, including the provision of a novel rubber-to-metal adhesive will become apparent from a consideration of the following specification and claims.

The method of the present invention comprises, in the laminating of rubber to metal, bringing together the surfaces of the rubber and of the metal to be joined with a layer comprising an allylically brominated 2,3-dichlorobutadiene-1,3 polymer therebetween said polymer being in direct contact with at least the rubber surface, and curing the assembly. The resulting bonded product thus comprises a rubber body and a metal body bonded together by means of an intermediate layer comprising the allylically brominated 2,3-dichlorobutadiene-1,3 polymer.

The present invention will be more readily understood from a consideration of the drawing in which.

Figure 1:
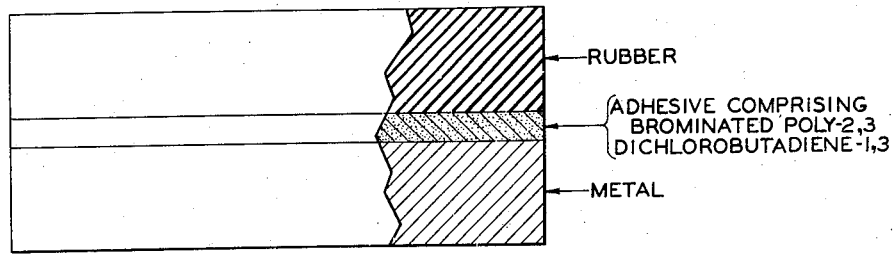
Figure 1 is an end elevational view, partly in section, illustrating an assembly bonded in accordance with the broader aspects of the invention.

In the preferred practice of the present invention there is used in conjunction with the brominated 2,3-dichlorobutadiene-1,3, another organic material possessing marked metal adherent properties either as a separate film at the bond line in contact with the metal or in admixture with the brominated 2,3-dichlorobutadiene-1,3 polymer. A particularly preferred composition, in this connection, for use as a rubber-to-metal adhesive in accordance with the present invention, is a mixture of brominated poly 2,3-dichlorobutadiene-1,3 and another material possessing marked metal adherent properties in the form of a solution.

The use of the allylically brominated polymerized 2,3-dichlorobutadiene-1,3 in the bonding of rubber to metal provides many advantages over the use of prior rubber-to-metal adhesives in general and poly 2,3-dichlorobutadiene-1,3 in particular. It has been found that the bond which is provided is stronger than the rubber itself, even with stocks of high strength, such that failure of the bonded assembly occurs within the body of the rubber rather than at the bond line. In addition, resistance of the bond to heat, solvents and moisture is outstanding. A particularly advantageous feature of the use of the allylically brominated 2,3-dichlorobutadiene-1,3 polymer in the bonding of rubber to metal is to be found in the wide variety of vulcanizing conditions under which adhesion may be produced. In general, the use of the stated polymer will result in the formation of bonds to rubber under more diverse rates of vulcanization, at more diverse vulcanizing temperatures and with rubbers of more diverse compounding recipes than is the case with the rubber-to-metal adhesive heretofore known.

The rubber which may be bonded to metal in accordance with the present invention may be selected from any of the natural rubbers and synthetic rubbers including polybutadiene, neoprene, polychloroprene, Buna-S, Buna-N, Butyl rubber, brominated Butyl rubber, and the like. The metals to which the rubber may be bonded may also be selected from any of the common structural metals such as iron, steel, stainless steel, lead, aluminum, copper, brass, bronze, Monel metal, nickel and zinc.

Referring to the allylically brominated 2,3-dichlorobutadiene-1,3 polymer employed in accordance with the present invention, the material is generally produced by allylically brominating polymerized 2,3-dichlorobutadiene-1,3 until a significant amount of bromine has been introduced into the polymer. The bromination may be carried out by means of free bromine, either alone or in the presence of a compound capable of combining with the hydrogen bromide formed in the reaction, or it may be carried out by means of an organic amide or imide in which hydrogen attached to nitrogen is replaced by bromine. In carrying out the reaction the polymerized 2,3-dichlorobutadiene-1,3 will be dissolved in a solvent such as a chlorinated aliphatic or aromatic hydrocarbon, which will dissolve at least 5%, by weight, of the polymer at or below the boiling point of the solvent and which itself is resistant to bromination. The bromination reaction is assisted by catalysts such as light, heat such as produced by infra-red rays, hydroperoxide or peroxide catalysts, and the like. This allylical bromination results in a thermoplastic, rubber-like polymeric material which is soluble in a wide variety of organic solvents.

In accordance with the broader aspects of the invention the brominated 2,3-dichlorobutadiene-1,3 employed may have a bromine content ranging from about 5%, by weight, to as high as about 32% (approximately 7.5–42 mol percent). The preferred material, however, will have a bromine content between about 10%, by weight, and about 27%, by weight (approximately 15–36 mol percent).

In carrying out the method of the present invention a film comprising the brominated 2,3-dichlorobutadiene-1,3 is interposed between the surface of the rubber body and the surface of the metal body which it is desired to bond together as illustrated in Figure 1. Such film is ordinarily provided through application of a solution comprising brominated 2,3-dichlorobutadiene-1,3 and permitting the solvent to evaporate.

Figure 2:
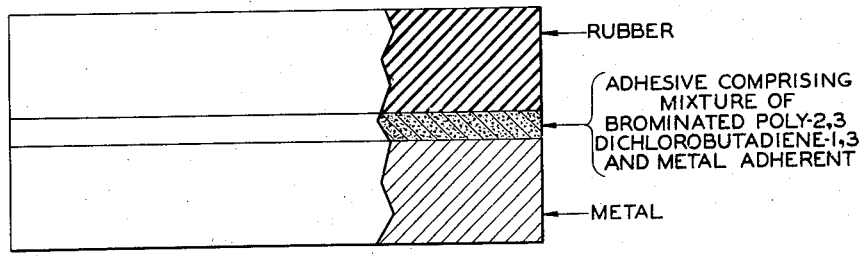
Figure 2 is an end elevational view, partly in section, illustrating an assembly bonded in accordance with one embodiment of the invention.
Figure 3:
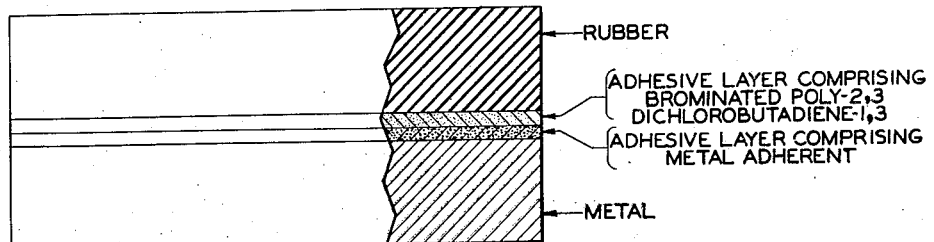
Figure 3 is an end elevational view, partly in section, illustrating an assembly bonded in accordance with another embodiment of the invention.

While rubber may be bonded to metal by means of the brominated 2,3-dichlorobutadiene-1,3 alone, since the brominated 2,3-dichlorobutadiene-1,3 possesses good metal adhesion properties in addition to its outstanding rubber adhesive properties, it is generally preferred to incorporate at the bond line another material possessing marked metal adhesion properties, referred to for the sake of simplicity herein as the "metal adherent." This "metal adherent" may be mixed with the brominated 2,3-dichlorobutadiene-1,3, and the resulting mixture in the form of a solution applied to the rubber and/or metal surface, as illustrated in Figure 2, or the metal adherent and the brominated 2,3-dichlorobutadiene-1,3 may be applied separately as illustrated in Figure 3. In connection with this latter embodiment, any one of several procedures may be followed, including applying a solution of the metal adherent to the metal surface and applying a solution comprising brominated 2,3-dichlorobutadiene-1,3 to the rubber surface; applying a solution of the metal adherent to the metal surface after the drying of which a solution of the brominated 2,3-dichlorobutadiene-1,3 is applied thereover, or a solution comprising the brominated 2,3-dichlorobutadiene-1,3 may be applied to the rubber surface following the drying of which a solution of the metal adherent is applied thereover. Various combinations of these means may be employed such as the application of a mixture high in brominated 2,3-dichlorobutadiene-1,3 and low in metal adherent to the rubber surface and the application of a mixture of brominated 2,3-dichlorobutadiene-1,3 and metal adherent high in metal adherent either thereover or to the metal surface. The exact procedure followed is not critical, the important factor being the interposition between the rubber surface and the metal surface to be bonded of an intermediate layer or film comprising the brominated 2,3-dichlorobutadiene-1,3, the brominated 2,3-dichlorobutadiene-1,3 being at least available at the interface between the intermediate layer and the rubber surface for adhesion to the rubber surface; and, in when an additional, metal adherent is employed, the metal adherent being at least available at the interface between the intermediate layer and the metal surface for bonding to the metal surface.

Referring specifically to the metal adherent, it may be selected from a wide variety of organic materials, that is compounds and polymers, and mixtures thereof which possess adhesive properties toward metal characteristic of adhesives commonly employed in adhesive bonded structural, load carrying fabrications of metal members with themselves and other structural elements. Such materials possess a high order of bond strength, usually at least about 20 pounds per lineal inch under stripping test, and a high order of cohesiveness. Organic compounds and polymeric materials that adhere to metal surfaces are well known and include the thermosetting condensation polymers, such as the thermosetting phenolaldehyde resins, the thermosetting epoxy resins, the thermosetting polyester resins, the thermosetting triazine resins, and the like; polymers and copolymers of polar ethylenically unsaturated materials, such as polyvinyl butyral, polyvinyl formal, polyvinyl acetate, chlorinated polyvinyl chloride, copolymers of vinyl acetate and vinyl chloride, chlorinated copolymers of vinyl acetate and vinyl chloride, polymers of acrylic acid, copolymers of acrylic acid and conjugated dienes such as butadiene-1,3, 2-chlorobutadiene-1,3, 2,3-dichlorobutadiene-1,3, and after halogenated products thereof, polymers of methacrylic acid, copolymers of methacrylic acid and conjugated dienes, copolymers of vinylpyridine and conjugated dienes, and polyvalent acid reaction products thereof, and the like; halogenated rubbers, such as chlorinated natural rubber and chlorinated synthetic rubber including chlorinated polychloroprene, chlorinated polybutadiene, chlorinated copolymers of butadiene and styrene, mixtures of chlorinated rubber with hydrohalogenated rubber or hypohalogenated rubber, and the like; polyisocyanates, such as P,P' diisocyanato, diphenyl methane, hexamethylene diisocyanate, P,P',P'' triisocyanato triphenyl methane, 3,3'-dimethyl-4,4'-biphenylene diisocyanate, 3,3'-dimethoxy-4,4'-biphenylene diisocyanate, phosgenated anilinealdeyde resins such as those disclosed in Patent 2,683,730, and the like. The brominated 2,3-dichlorobutadiene-1,3 polymer may not be fully miscible with certain of the metal adherents, and in such cases a multicoat system as discussed above may be employed.

The solvent employed in applying the adhesive material or materials may be any organic liquid or mixtures thereof in which the ingredients to be applied are soluble to the extent dictated by the viscosity of the solution and the exact means of application employed. Generally, the solids content of the solution may range from as low as about 5% to as high as about 30%, although, in most cases where the adhesive will be applied by brushing, the solids content will range from about 10% to about 25%. The solvent employed should also be readily volatile so that lengthy drying periods are not encountered. The preferred solvents, especially for the brominated 2,3-dichlorobutadiene-1,3, are aromatic hydrocarbons such as benzene, toluene, xylene, and the like and the chlorinated aromatic hydrocarbons such as monochlorobenzene, dichlorobenzene, and the like. Small amounts of aliphatic hydrocarbons, chloroaliphatic hydrocarbons, ketones, and/or alcohols may be included, if desired.

As a general purpose adhesive requiring but a single application of material it is generally preferred to employ a mixture of the brominated 2,3-dichlorobutadiene-1,3 and metal adherent. In such a mixture, as between the two main components, the brominated 2,3-dichlorobutadiene-1,3 will generally make up between about 10% and about 50% and the metal adherent between about 90% and about 50% of the mixture. Outstanding all purpose rubber-to-metal adhesives have been prepared in which the proportions of metal adherent to brominated 2,3-dichlorobutadiene-1,3 lie between about 65 and about 85% of the former and between about 15% and about 35% of the latter. Particularly advantageous metal adherents for use in such mixtures are chlorinated natural and synthetic rubber.

After the adhesive component or components have been applied as described above and the solvent evaporated, the rubber surface and the metal surface which are to be bonded are brought together and heated under pressure to cause vulcanization. As is well known in the art, the exact time and temperature of curing will vary depending upon the nature of the rubber body employed as well as on the nature of the ingredients in the adhesive phase. In general, however, the temperature during curing will be between about 270° F. and about 350° F. and the curing time will range from about 20 to about 60 minutes.

One of the primary features of the present invention is that the bonding of rubber to metal is so effective that it it is ordinarily impossible to separate the rubber from the metal without a resulting rupture or splitting of the elastomer stock used in the test. The bonds provided are further characterized by their great strength at high temperatures which is an advantage in that the bonded article may be ejected from a hot press or mold without a resulting rupture of the bond. The present invention enables the bonding of a wide variety of different elastomers to metal with apparently equal success without any further modification. The invention is effective in bonding rubber stocks having a wide range of curing rates. Whereas a variety of different adhesives have heretofore been necessary to bond different elastomers to steel, the present invention makes possible formation of excellent bonds of the various elastomers to steel. In direct contrast to some of the adhesives of the prior art, it is not necessary to add other ingredients such as curing agents, accelerators, fillers or pigments to the adhesive employed in accordance with the present invention in order to develop maximum bond strength. Since the use of such ingredients is undesirable in view of the fact that it is troublesome to keep them well dispersed in order to avoid a high percentage of rejects, and since the use of these ingredients often causes premature curing of the dispersed or dissolved polymer used and subsequent low "pot life," and since the use of these ingredients often leads to a "curing" of the elastomer to be bonded with a subsequent loss in bond strength due to failure of the weakened elastomer stock, the present invention represents a considerable improvement and advance in the art. Furthermore, cements comprising the brominated 2,3-dichlorobutadiene-1,3 in typical non-polar organic solvents are stable for long periods of time (in excess of six months), and may be used after this time without any apparent loss in effectiveness.

The following examples are given to illustrate the invention and are not intended to limit the scope of the invention in any way inasmuch as the relative proportions may vary and the ingredients may be substituted by others which perform the equivalent function to those given.

EXAMPLES I TO VI

In these examples, the following elastomer stocks were bonded to cold rolled steel.

*Elastomer stocks*

| Natural Rubber | | A | B |
|---|---|---|---|
| Smoked sheet | parts | 100 | 100 |
| Breakdown | min | 15 | 15 |
| Fine thermal black | parts | 50 | |
| Semi-reinforcing black | do | | 50 |
| Zinc oxide | do | 5 | 5 |
| Stearic acid | do | 2 | 3 |
| Sulfur | do | 2.5 | 3 |
| Phenyl-beta-naphthylamine | do | 2 | 1 |
| Mercaptobenzothiazole | do | 1 | 1.5 |

| Neoprene | | C |
|---|---|---|
| Neoprene Type "W" | parts | 100 |
| Breakdown | min | 10 |
| Zinc oxide | parts | 5 |
| Magnesium oxide | do | 4 |
| Fine thermal black | do | 50 |
| Phenyl-beta-naphthylamine | do | 2 |
| 2-Mercaptoimidazoline | do | 0.5 |

The metal to be bonded, which was cold rolled steel either in the form of metal strips 1 x 2.375 x 0.037 inches or circular buttons having 1 square inch surface area to be bonded, were sandblasted with fine grit, degreased and stored under toluene or xylene until used. A thin film of chlorinated rubber (125 cps. grade) was then applied to the metal by brushing from a 20% solids toluene solution and allowed to stand at room temperature until visibly dry (10 to 15 minutes). A thin film of the allylically brominated dichlorobutadiene polymer was then similarly applied over the first film, by brushing from a 20% solids toluene solution. When the film of brominated polymer was visibly dry, the elastomer stock was applied in the thickness indicated, and the assembly cured in a suitable mold or press under the indicated conditions.

The strength of the bond in case of the strips was determined by stripping a free end of the elastomer stock at an angle normal to the plane of the strip on a standard Scott tensile testing machine at a rate of about 2 inches per minute. In the case of the butt-joint assembly, the two buttons having an elastomer sandwich bonded to each were pulled in directly opposite directions, 180°, at the same rate. The strength of the bond, in the case of the strips was recorded in lb. per linear inch.

*Elastomer-to-metal adhesion*

| Example | Stock | Temp. of Test, °C. | Adhesion | |
|---|---|---|---|---|
| | | | Strip, lb./in. | "Butt-joint," p.s.i. |
| I | A | 30 | 50-60 | |
| II | B | 30 | [1] 73 | [1] 1,040 |
| III | B | 30 | [1] 105 | |
| IV | B | 75 | [1] 60 | |
| V | C | 30 | [1] 125 | |
| VI | C | 30 | | [1] 1,100 |

[1] Failure due to splitting of stock rather than bond.

As a control, Example I was repeated using partially chlorinated 2,3-dichlorobutadiene-1,3 polymer (67.8% total chlorine) made by chlorinating a dichlorobutadiene polymer in carbon tetrachloride containing a small amount of iodine. The chlorine in the polymer represents about a 28 mol percent excess of chlorine, based on the dichlorobutadiene. The adhesion, using this polymer, was from 1 to 2 pounds per inch, and the failure was at the bond indicating a very low bond strength in comparison with the adhesion obtained in the foregoing examples.

In Example I the laminated stock was cured at 284° F. for 60 minutes. In all the other examples, the cure was 30 minutes at 310° F. The rubber stock used in the strip test was .08 inch thick in Example I, and .18 inch thick in each of the other examples.

EXAMPLES VII TO X

In these examples 70 parts of chlorinated rubber were mixed with 30 parts of the allylically brominated 2,3-dichlorobutadiene-1,3 (on a dry weight basis), having the bromine content set forth below, and made up into a 20% solids cement in toluene. These adhesives were tested against natural rubber stock "D" by applying one coat of the adhesive to the metal by brushing, allowing to stand until visibly dry, applying the elastomer stock and curing the resulting assembly for 30 minutes at 302° F.

ELASTOMER STOCK "D" (NATURAL RUBBER)

| | | |
|---|---|---|
| Smoked sheet | parts | 100 |
| Breakdown | minutes | 5.0 |
| Easy processing channel black | parts | 50 |
| Zinc oxide | do | 5.0 |
| Stearic acid | do | 1.0 |
| Sulfur | do | 2.5 |
| Phenyl-beta-naphthylamine | do | 2.0 |
| Mercaptobenzothiazole | do | 1.0 |

| Ex. | Mol Percent Br in polymer | Butt-joint adhesion, p.s.i. | Failure | Strip adhesion tested at 248° F., lbs./in. width | Failure |
|---|---|---|---|---|---|
| VII | 18.2 | 1,317 | Split stock | 37 | At bond. |
| VIII | 23.5 | 1,335 | do | 72 | Split stock. |
| IX | 27.4 | 1,285 | do | 67 | Do. |
| X | 26.0 | 1,370 | do | 91 | Do. |

The strip adhesion test was made at 248° F. instead of room temperature as in Examples I to VI above, and the test is more severe at elevated temperatures.

EXAMPLES XI TO XV

In these examples the following elastomer compounds were used.

Elastomer compounds

"E" NATURAL RUBBER

| | Parts |
|---|---|
| Smoked sheet | 100 |
| High abrasion furnace black | 50 |
| Zinc oxide | 15 |
| Stearic acid | 1 |
| Sulfur | 2 |
| Benzothiazyl disulfide | 1.5 |
| Zinc dimethyl dithiocarbamate | 0.2 |

"F" NEOPRENE

| | |
|---|---|
| Neoprene type WRT | 100 |
| Fine furnace black | 50 |
| Zinc oxide | 5 |
| Magnesium oxide | 4 |
| Stearic acid | 0.5 |
| 2-mercaptoimidazoline | 0.5 |

"G" GR-S

| | |
|---|---|
| GR-S (standard) | 100 |
| Channel black | 60 |
| Zinc oxide | 5 |
| Sulfur | .35 |
| Tetraethylithiuramdisulfide | 3.5 |

In these examples, a primer coat consisting of a specified metal adherent in a specified solvent was applied to degreased, grit blasted steel and allowed to dry for approximately 30 minutes. In each case, a secondary coat consisting of a mixture of 100 parts brominated poly 2,3-dichlorobutadiene-1,3 (approximately 27 mol percent Br) and 300 parts toluene, was applied over the first film and allowed to dry. The indicated elastomer compound was then applied to the adhesive coated metal and the assembly vulcanized 30 minutes at 307° F. The bonds thus formed were of such strength that in all cases attempts to strip the rubber from the metal resulted in failure to the body elastomer.

| | Composition of Metal Priming Coat | Elastomer employed |
|---|---|---|
| Example XI | 100 parts ketone soluble, base catalyzed, solid, thermosetting resinous phenol-aldehyde condensate<br>200 parts methyl ethyl ketone | F |
| Example XII | 100 parts polyvinyl butyral, XYHL grade<br>666 parts methanol | E |
| Example XIII | 100 parts chlorinated neoprene (chlorine 67%, viscosity 20% solution in toluene 125 cps. at 25° C.)<br>300 parts toluene | E |
| Example XIV | 100 parts P,P',P'' triisocyanato triphenyl methane<br>300 parts methylene chloride | G |
| Example XV | 100 parts chlorinated polyvinyl chloride (Vinyon N)<br>400 parts monochlorobenzene | F |

EXAMPLE XVI

A solution consisting of 100 parts brominated poly 2,3-dichlorobutadiene-1,3 (approximately 27 mol percent Br) and 400 parts of toluene was applied to a sulfuric acid anodized, water sealed Duralumin (24 st.) surface and allowed to dry. A ¼" slab of natural rubber (same compound as "E" in Examples XII and XIII) was applied to the coated metal surface. The assembly was cured in a conventional molding press for 30 minutes at 307° F. The adhesion produced was such that the rubber stock could not be stripped from the metal without tearing into the body of elastomer.

EXAMPLE XVII

An adhesive consisting of 70 parts chlorinated neoprene (67% chlorine), 30 parts brominated poly 2,3-dichlorobutadiene-1,3 (27 mol percent bromine) and 400 parts toluene was applied to a degreased, grit blasted steel surface and allowed to dry. A slab of natural rubber (same compound as "E" in Examples XII and XIII) was applied to the coated metal surface. The assembly was cured for 30 minutes at 274° F. The adhesion produced was such that the rubber could not be stripped from the metal without tearing into the body of elastomer.

EXAMPLE XVIII

A mixture consisting of 100 parts vinyl chloride-vinyl acetate copolymer (VMCH grade), 200 parts toluene and 200 parts methyl ethyl ketone was brushed on a degreased, grit blasted steel surface and allowed to dry. A second composition consisting of 70 parts chlorinated natural rubber (125 cps. grade), 30 parts brominated poly 2,3-dichlorobutadiene-1,3 (27 mol. percent bromine) and 400 parts toluene was applied over the copolymer and allowed to dry. The coated metal surface was fabricated with a natural rubber compound (same compound as "E" in Examples XII and XIII) and the assembly cured for 30 minutes at 274° F. The adhesion was such that, upon attempting to strip the rubber from the metal, failure occurred within the body of elastomer.

EXAMPLE XIX

An adhesive consisting of 70 parts chlorinated natural rubber (125 cps. grade), 30 parts brominated poly 2,3-dichlorobutadiene-1,3 (29 mol percent bromine) and 300 parts toluene was applied to the following surfaces:

Brass, degreased, grit blasted
Anodized dural, degreased
18-8 stainless steel, degreased, grit blasted cadmium plated steel, degreased.

An unvulcanized rubber compound:

| | Parts |
|---|---|
| Smoked sheet | 100.0 |
| HAF black | 5.0 |
| Zinc oxide | 15.0 |
| Stearic acid | 1.0 |
| Sulfur | 2.0 |
| Benzothiazyl disulfide | 1.5 |
| Zinc dimethyl dithiocarbamate | 0.2 | was applied to the coated surfaces and the assembly cured for 30 minutes at 307° F. in a conventional molding press. The adhesion produced in all cases were such as to cause tearing of the elastomer body on stripping.

The following Examples XX to XXIV illustrate differences in adhesive properties between brominated poly 2,3 dichlorobutadiene-1,3, poly 2,3 dichlorobutadiene-1,3 and chlorinated 2,3 dichlorobutadiene-1,3.

EXAMPLE XX

A mixture of 100 parts chlorinated natural rubber (125 cps. grade) and 400 parts toluene was brushed on strips of degreased, grit blasted cold rolled steel, 2⅜" x 1" x .062" and allowed to dry for approximately 30 minutes. To one group of coated strips was then applied, over the chlorinated rubber film, a 20% solids toluene solution of brominated 2,3 dichlorobutadiene-1,3 (27.8 mol percent bromine); to a second group was applied a 20% solids toluene solution of poly 2,3 dichlorobutadiene-1,3, and to a third group was applied a 20% solids toluene solution of chlorintaed 2,3 dichlorobutadiene-1,3 (16.3 mol percent additional chlorine). The assemblies were permitted to dry for approximately 30 minutes. A ¼" slab of freshly sheeted unvulcanized neoprene (same compound as "F" in Examples XI and XV) was applied to each coated surface and the assembly vulcanized for 30 minutes at 274° F.

Adhesion was measured in all cases by the strip test, the results being as follows:

| | Adhesion, lb./in. |
|---|---|
| Brominated poly 2,3 dichlorobutadiene-1,3 (27.8 mol percent bromine) | 95 |
| Poly 2,3 dichlorobutadiene-1,3 | 32 |
| Chlorinated poly 2,3 dichlorobutadiene-1,3 (16.3 mol percent additional chlorine) | 62 |

EXAMPLE XXI

Mixtures of 30 parts of the following 2,3 dichlorobutadiene-1,3 polymers, 70 parts chlorinated natural rubber and 400 parts toluene were applied to strips of degreased, grit blasted steel and allowed to dry for approximately 30 minutes. In each case a ¼" slab of freshly sheeted natural rubber compound consisting of

| | Parts |
|---|---|
| Smoked sheet | 100 |
| Channel black | 40 |
| Zinc oxide | 10 |
| Sulfur | 2.5 |
| 2-mercaptobenzothiazole | 0.5 |
| Benzothiazyl disulfide | 0.5 |
| Zinc diethyl dithiocarbamate | 0.2 |
| Pine tar | 2 |
| Phenylbetanaphthylamine | 1.5 | was applied to the coated surface and the assembly vulcanized for 30 minutes at 274° F.

Adhesion was measured in all cases by the strip test, the results being as follows:

| Mixture of Chlorinated Rubber Plus— | Adhesion, lb./in. |
|---|---|
| Poly 2,3 dichlorobutadiene-1,3 | 28 |
| Chlorinated poly 2,3 dichlorobutadiene-1,3 (2.7 mol percent additional chlorine) | 18 |
| Chlorinated poly 2,3 dichlorobutadiene-1,3 (16.9 mol percent additional chlorine) | 18 |
| Chlorinated poly 2,3 dichlorobutadiene-1,3 (52 mol percent additional chlorine) | 10 |
| Brominated poly 2,3 dichlorobutadiene-1,3 (15.6 mol percent bromine) | 75 |
| Brominated poly 2,3 dichlorobutadiene-1,3 (22.3 mol percent bromine) | 67 |
| Brominated poly 2,3 dichlorobutadiene-1,3 (27.8 mol percent bromine) | 79 |
| Brominated poly 2,3 dichlorobutadiene-1,3 (40.2 mol percent bromine) | 47 |

EXAMPLE XXII

A 20% solids toluene solution of chlorinated natural rubber was applied to steel strips and allowed to dry. Mixtures of 70 parts of chlorinated natural rubber, 30 parts of the 2,3 dichlorobutadiene-1,3 polymer specified below and 400 parts of toluene were then applied to separate coated strips and allowed to dry. In all cases, a slab of GR-S compound consisting of:

| | Parts |
|---|---|
| GR-S standard | 100.0 |
| HAF black | 50.0 |
| Zinc oxide | 3.0 |
| Stearic acid | 2.0 |
| Sulfur | 1.8 |
| N-cyclohexyl-2-benzothiazole sulfenamide | 1.0 |
| Phenyl-beta-naphthylamine | 1.25 |
| Rosin | 10.0 | was applied to the coated strips and the assembly cured for 30 minutes at 307° F. Adhesion measurements were made by the strip test, the results of which are as follows:

| 2,3 dichlorobutadiene-1,3 polymer | Adhesion, lb./in. |
|---|---|
| Poly 2,3 dichlorobutadiene-1,3 | 45 |
| Chlorinated poly 2,3 dichlorobutadiene-1,3 (2.7 mol percent additional chlorine) | 20 |
| Chlorinated poly 2,3 dichlorobutadiene-1,3 (16.9 mol percent additional chlorine) | 35 |
| Chlorinated poly 2,3 dichlorobutadiene-1,3 (52 mol percent additional chlorine) | 28 |
| Brominated 2,3 dichlorobutadiene-1,3 (15.6 mol percent bromine) | 105 |
| Brominated 2,3 dichlorobutadiene-1,3 (22.3 mol percent bromine) | 98 |
| Brominated 2,3 dichlorobutadiene-1,3 (27.8 mol percent bromine) | 75 |
| Brominated 2,3 dichlorobutadiene-1,3 (40.2 mol percent bromine) | 78 |

EXAMPLE XXIII

A mixture of 70 parts chlorinated natural rubber, 30 parts of the 2,3 dichlorobutadiene-1,3 polymer specified below and 400 parts toluene is applied to steel strips, and allowed to dry. A slab of natural rubber compound consisting of:

| | Parts |
|---|---|
| Smoked sheet | 100.0 |
| HAF black | 5.0 |
| Zinc oxide | 15.0 |
| Stearic acid | 1.0 |
| Sulfur | 2.0 |
| Benzothiazyl disulfide | 1.5 |
| Zinc dimethyl dithiocarbamate | 0.2 | was applied to each coated strip and the assembly cured 30 minutes at 288° F.

Adhesion tests were made by the strip method, the results of which are as follows:

| 2,3 dichlorobutadiene-1,3 polymer | Adhesion, lb./in. |
|---|---|
| Poly 2,3 dichlorobutadiene-1,3 | 15 |
| Chlorinated 2,3 dichlorobutadiene-1,3 (2.7 mol percent additional chlorine) | 5 |
| Chlorinated 2,3 dichlorobutadiene-1,3 (16.9 mol percent additional chlorine) | 5 |
| Chlorinated 2,3 dichlorobutadiene-1,3 (52 mol percent additional chlorine) | 0 |
| Brominated 2,3 dichlorobutadiene-1,3 (15.6 mol percent bromine) | 60 |
| Brominated 2,3 dichlorobutadiene-1,3 (22.3 mol percent bromine) | 45 |
| Brominated 2,3 dichlorobutadiene-1,3 (27.8 mol percent bromine) | 42 |

EXAMPLE XXIV

A mixture of 70 parts chlorinated natural rubber, 30 parts of the 2,3 dichlorobutadiene-1,3 polymer specified below and 400 parts toluene was applied to steel strips and allowed to dry. A slab of GR-S compound consisting of

| | Parts |
|---|---|
| GR-S standard | 100.0 |
| Channel black | 45.0 |
| Tetraethylthiuram disulfide | 3.5 |
| Sulphur | .35 |
| Zinc oxide | 5.0 | was applied to each coated strip and the assembly was cured for 30 minutes at 274° F. Adhesion tests were made by the strip tests, the results of which are as follows:

| 2,3 dichlorobutadiene-1,3 polymer | Adhesion, lb./in. |
|---|---|
| Poly 2,3 dichlorobutadiene-1,3 | 20 |
| Chlorinated poly 2,3 dichlorobutadiene-1,3 (2.7 mol percent additional chlorine) | 38 |
| Chlorinated poly 2,3 dichlorobutadiene-1,3 (16.9 mol percent additional chlorine) | 20 |
| Chlorinated poly 2,3 dichlorobutadiene-1,3 (52 mol percent additional chlorine) | 18 |
| Brominated poly 2,3 dichlorobutadiene-1,3 (15.6 mol percent bromine) | 62 |
| Brominated poly 2,3 dichlorobutadiene-1,3 (22.3 mol percent bromine) | 68 |
| Brominated poly 2,3 dichlorobutadiene-1,3 (27.8 mol percent bromine) | 62 |
| Brominated poly 2,3 dichlorobutadiene-1,3 (40.2 mol percent bromine) | 60 |

While the compositions disclosed herein are particularly suited in bonding rubber to metal, many of them find other uses, especially due to their adhesive and film-forming properties.

Considerable modification is possible in the selection of the various ingredients and amounts thereof, as well as in the particular technique employed in practicing the present invention without departing from the scope of the invention.

We claim:

1. A composition of matter possessing adhesive properties toward rubber and metal comprising a solution of a mixture of brominated poly 2,3 dichlorobutadiene-1,3 having a bromine content of between about 15 and about 35 mol percent and chlorinated rubber, said brominated poly 2,3 dichlorobutadiene-1,3 being present in an amount between about 15 and about 35%, by weight, and said chlorinated rubber being present in an amount between about 65 and about 85%, by weight, based on the weight of said two components.

2. A composition of matter comprising a solution of a mixture of brominated poly 2,3 dichlorobutadiene-1,3 and a polyisocyanate.

3. The product of claim 2 wherein said polyisocyanate is a phosgenated aniline-aldehyde resin.

4. In the bonding of rubber to metal involving interposing between the rubber body and the metal body an intermediate phase adherable to metal and to rubber and heating the composite structure under pressure, the improvement which comprises the step of interposing between said metal body and rubber body an intermediate phase comprising brominated poly 2,3 dichlorobutadiene-1,3, brominated poly 2,3 dichlorobutadiene-1,3 being in direct contact with at least the rubber surface.

5. The method of claim 4 wherein said polymer has a bromine content of between about 7.5 and about 42 mol percent.

6. In the bonding of rubber to meta linvolving interposing between the rubber body and the metal body an intermediate phase adherable to metal and to rubber and heating the composite structure under pressure, the improvement which comprises the step of interposing between said metal body and rubber body an intermediate phase comprising brominated poly 2,3 dichlorobutadiene-1,3 and a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test, brominated poly 2,3 dichlorobutadiene-1,3 being in direct contact with at least the rubber surface and the material possessing adhesive properties toward metal being in direct contact with at least said metal surface.

7. The method of claim 6 wherein said brominated poly 2,3 dichlorobutadiene-1,3 polymer has a bromine content of between about 7.5 and about 42 mol percent, and wherein said material possessing adhesive properties toward metal is such a material selected from the group consisting of thermosetting phenol-aldehyde resins, thermosetting epoxy resins, thermosetting polyester resins, chlorinated polyvinyl chloride, copolymers of vinyl acetate and vinyl chloride, chlorinated copolymers of vinyl acetate and vinyl chloride, copolymers of acrylic acid and conjugated dienes, after-halogenated copolymers of acrylic acid and conjugated dienes, copolymers of methacrylic acid and conjugated dienes, copolymers of vinyl pyridine and conjugated dienes, halogenated rubbers and polyisocyanates.

8. In the bonding of rubber to metal involving interposing between the rubber body and the metal body an intermediate phase adherable to metal and to rubber and heating the composite structure under pressure, the improvement which comprises the steps of applying to a surface of said metal a film comprising a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test, applying over said film comprising said material possessing adhesive properties toward metal a film comprising brominated poly 2,3 dichlorobutadiene-1,3, and bringing said coated metal surface in contact with said rubber surface.

9. In the bonding of rubber to metal involving interposing between the rubber body and the metal body an intermediate phase adherable to metal and to rubber and heating the composite structure under pressure, the improvement which comprises applying to a surface of said rubber a film comprising brominated poly 2,3 dichlorobutadiene-1,3, applying over said polymer film a film comprising a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test, and bringing said coated rubber surface in contact with a surface of said metal.

10. In the bonding of rubber to metal involving interposing between the rubber body and the metal body an intermediate phase adherable to metal and to rubber and heating the composite structure under pressure, the improvement which comprises applying to a surface of said metal a film comprising a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test, applying to a surface of said rubber a film comprising brominated poly 2,3 dichlorobutadiene-1,3, and bringing said coated surfaces together.

11. In the bonding of rubber to metal involving interposing between the rubber body and the metal body an intermediate phase adherable to metal and to rubber and heating the composite structure under pressure, the improvement which comprises bringing together the surfaces of the rubber and the metal to be joined with a layer comprising a mixture of brominated poly 2,3 dichlorobutadiene-1,3 and a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test therebetween.

12. The method of claim 11 wherein said mixture comprises between about 10% and about 50% of said brominated poly 2,3 dichlorobutadiene-1,3 and between about 90% and about 50% of said material possessing adhesive properties toward metal based on the weight of said two components.

13. The method of claim 11 wherein said mixture comprises between about 15% and about 35% of said brominated poly 2,3 dichlorobutadiene-1,3 and between about 65% and about 85% of said material possessing adhesive properties toward metal based on the weight of said two components.

14. In the bonding of rubber to metal involving interposing between the rubber body and the metal body an intermediate phase adherable to metal and to rubber and heating the composite structure under pressure, the improvement which comprises applying to a surface of said metal a film comprising a mixture of brominated poly 2,3 dichlorobutadiene-1,3 and a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test, and bringing said coated metal surface in contact with a surface of said rubber.

15. In the bonding of rubber to metal involving interposing between the rubber body and the metal body an intermediate phase adherable to metal and to rubber and heating the composite structure under pressure, the improvement which comprises the step of interposing between said metal body and rubber body an intermediate phase comprising chlorinated rubber and brominated poly 2,3 dichlorobutadiene-1,3, chlorinated rubber being in direct contact with at least said metal surface and brominated poly 2,3 dichlorobutadiene-1,3 being in direct contact with at least the rubber surface.

16. In the bonding of rubber to metal involving interposing between the rubber body and the metal body an intermediate phase adherable to metal and to rubber and heating the composite structure under pressure, the improvement which comprises the step of interposing between said metal body and rubber body an intermediate phase comprising a mixture of brominated poly 2,3 dichlorobutadiene-1,3 having a bromine content between about 7.5 and about 42 mol percent and chlorinated rubber, said brominated poly 2,3 dichlorobutadiene-1,3 being present in an amount between about 10% and about 50% and said chlorinated rubber being present in an amount between about 50% and about 90%, based on the weight of said two components.

17. In the bonding of rubber to metal involving interposing between the rubber body and the metal body an intermediate phase adherable to metal and to rubber and heating the composite structure under pressure, the improvement which comprises the step of interposing between said metal body and rubber body an intermediate phase comprising a mixture of brominated poly 2,3 dichlorobutadiene-1,3 having a bromine content of between about 15 and about 35 mol percent and chlorinated rubber, said brominated poly 2,3 dichlorobutadiene-1,3 being present in an amount between about 15% and about 35%, by weight, and said chlorinated rubber being present in an amount between about 65% and about 85%, by weight, based on the weight of said two components.

18. As a new article of manufacture, a rubber-metal bonded assembly comprising a rubber body bonded to a metal body by means of an intermediate layer comprising brominated poly 2,3 dichlorobutadiene-1,3.

19. As a new article of manufacture, a rubber-metal bonded assembly comprising a rubber body bonded to a metal body by means of an intermediate layer comprising brominated poly 2,3 dichlorobutadiene-1,3 and a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test, brominated poly 2,3 dichlorobutadiene-1,3 being in contact with at least said rubber body and said material possessing adhesive properties toward metal being in contact with at least said metal body.

20. The product of claim 19 wherein said material possessing adhesive properties toward metal is such a material selected from the group consisting of thermosetting phenol-aldehyde resins, thermosetting epoxy resins, thermosetting polyester resins, chlorinated polyvinyl chloride, copolymers of vinyl acetate and vinyl chloride, chlorinated copolymers of vinyl acetate and vinyl chloride, copolymers of acrylic acid and conjugated dienes, afterhalogenated copolymers of acrylic acid and conjugated dienes, copolymers of methacrylic acid and conjugated dienes, copolymers of vinyl pyridine and conjugated dienes, halogenated rubbers and polyisocyanates.

21. As a new article of manufacture, a rubber-metal bonded assembly comprising a rubber body bonded to a metal body by means of an intermediate layer comprising a mixture of brominated poly 2,3 dichlorobutadiene-1,3 and a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test.

22. As a new article of manufacture a rubber-metal bonded assembly comprising a rubber body bonded to a metal body by means of an intermediate layer comprising a mixture of brominated poly 2,3 dichlorobutadiene-1,3 and chlorinated rubber.

23. As a new article of manufacture a rubber-metal bonded assembly comprising a rubber body bonded to a metal body by means of an intermediate layer comprising a mixture of brominated poly 2,3 dichlorobutadiene-1,3 having a bromine content between about 7.5 and about 42 mol percent and chlorinated rubber, said brominated poly 2,3 dichlorobutadiene-1,3 being present in an amount between about 10% and about 50%, by weight, and said chlorinated rubber being present in an amount between about 50% and about 90%, by weight, based on the weight of said two components.

24. As a new article of manufacture a rubber-metal bonded assembly comprising a rubber body bonded to a metal body by means of an intermediate layer comprising a mixture of brominated poly 2,3 dichlorobutadiene-1,3 having a bromine content of between about 15 and about 35 mol percent and chlorinated rubber, said brominated poly 2,3 dichlorobutadiene-1,3 being present in an amount between about 15% and about 35%, by weight, and said chlorinated rubber being present in an amount between about 65% and about 85%, by weight, based on the weight of said two components.

25. A composition of matter possessing adhesive properties toward rubber and metal comprising a solution of a mixture of brominated poly 2,3 dichlorobutadiene-1,3 and a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test.

26. A composition of matter possessing adhesive properties toward rubber and metal comprising a solution of a mixture of brominated poly 2,3 dichlorobutadiene-1,3 having a bromine content between about 7.5 and about 42 mol percent and a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test.

27. A composition of matter possessing adhesive properties toward rubber and metal comprising a solution of a mixture of brominated poly 2,3 dichlorobutadiene-1,3 having a bromine content between about 7.5 and about 42 mol percent and a material possessing adhesive properties toward metal characteristic of adhesives commonly employed in adhesive-bonded, structural, load-carrying fabrications of metal members with themselves and other structural elements and possessing a bond strength toward metal of at least 20 pounds per lineal inch under stripping test, said brominated poly 2,3 dichlorobutadiene-1,3 being present in an amount between about 10% and about 50%, by weight, and said material possessing adhesive properties toward metal being present in an amount between about 50% and about 90%, by weight, based on the weight of said two components.

28. A composition of matter possessing adhesive properties toward rubber and metal comprising a solution of a mixture of brominated poly 2,3 dichlorobutadiene-1,3 having a bromine content between about 7.5 and about 42 mol percent and chlorinated rubber, said brominated poly 2,3 dichlorobutadiene-1,3 being present in an amount between about 10% and about 50%, by weight, and said chlorinated rubber being present in an amount between about 50% and about 90%, by weight, based on the weight of said two components.

29. A composition of matter possessing adhesive properties toward rubber and metal comprising a solution of a mixture of brominated poly 2,3 dichlorobutadiene-1,3 and chlorinated rubber.

References Cited in the file of this patent

UNITED STATES PATENTS

| | | |
|---|---|---|
| 2,352,705 | Garvey et al. | July 4, 1944 |
| 2,471,905 | Smith | May 31, 1949 |
| 2,514,195 | Kuhn | July 4, 1950 |
| 2,581,920 | Kuhn | Jan. 8, 1952 |
| 2,725,373 | Reynolds | Nov. 29, 1955 |

FOREIGN PATENTS

| | | |
|---|---|---|
| 481,396 | Great Britain | Mar. 10, 1938 |